Patented June 16, 1931

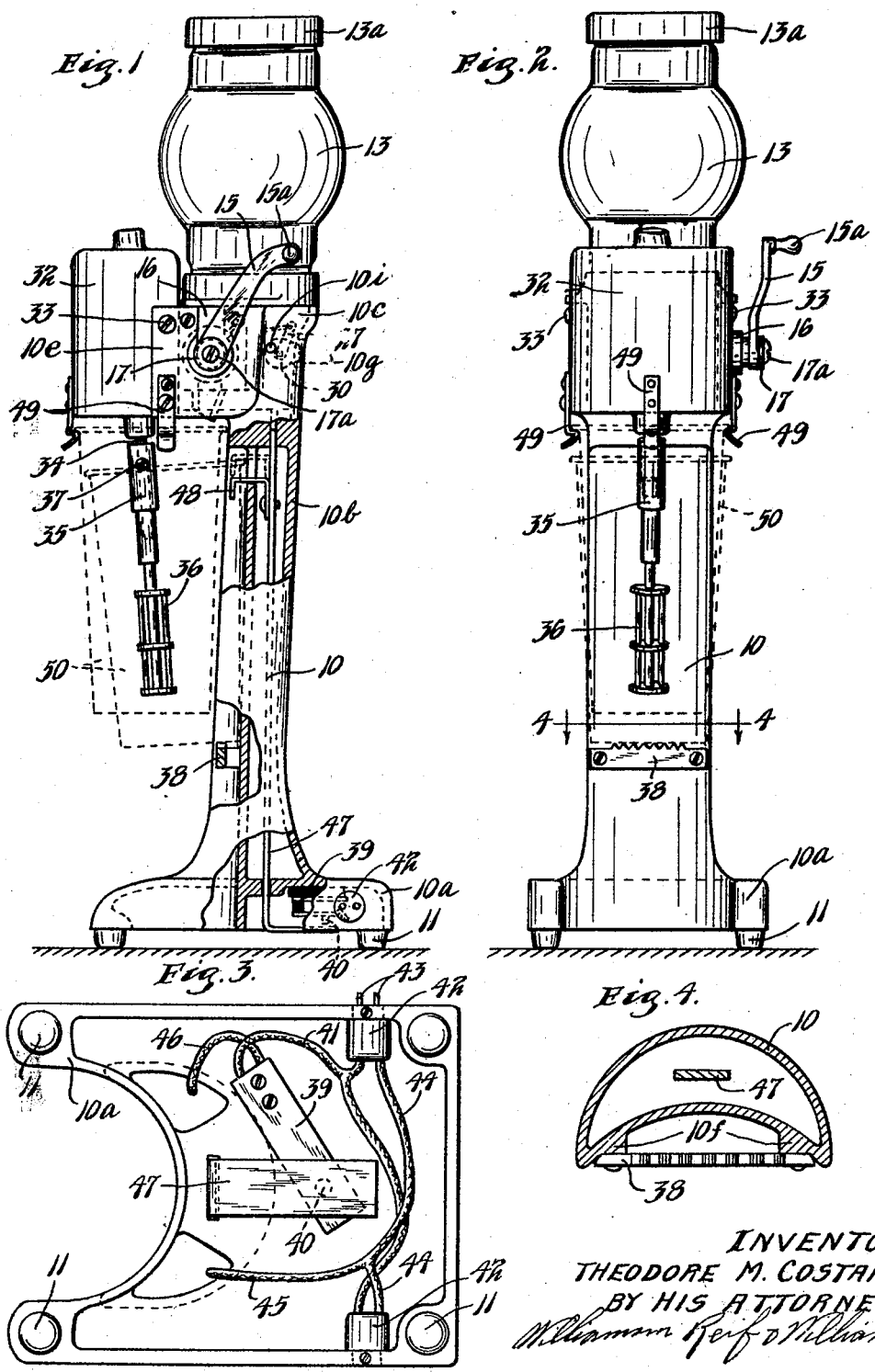

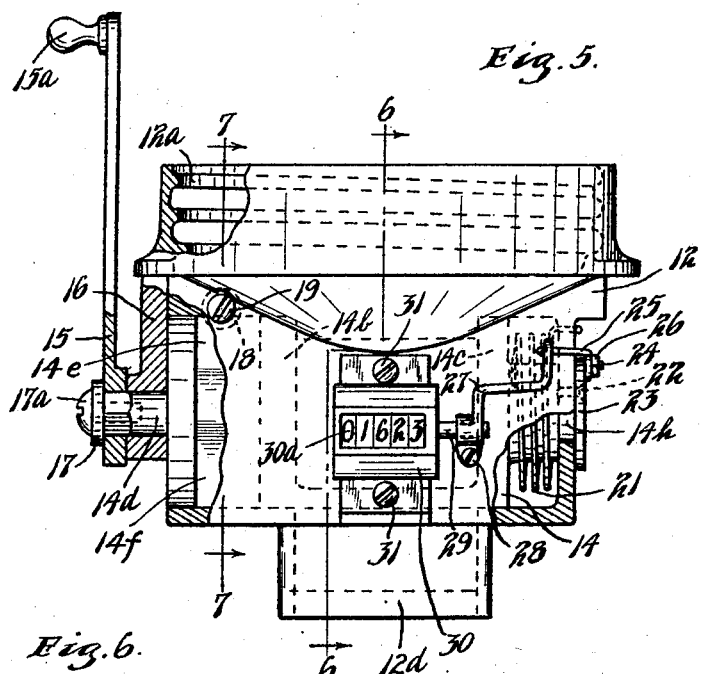
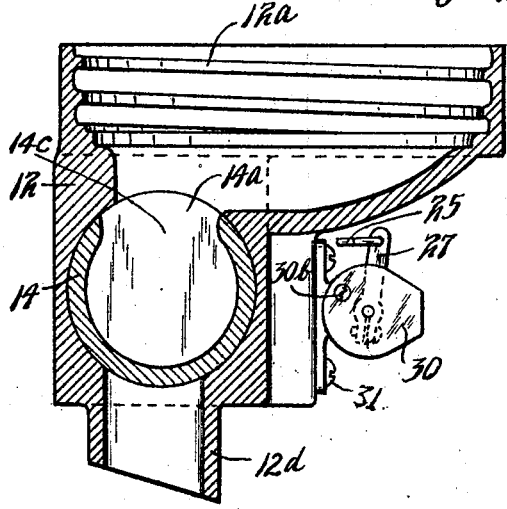
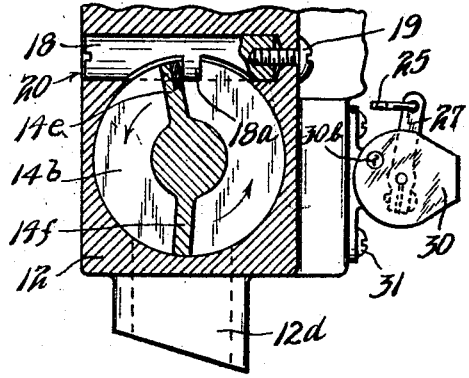

1,810,554

UNITED STATES PATENT OFFICE

THEODORE M. COSTAKOS, OF MINNEAPOLIS, MINNESOTA

DRINK MIXING DEVICE

Application filed November 11, 1929, Serial No. 406,377. Renewed November 20, 1930.

This invention relates to a device for mixing drinks and particularly to a device for mixing drinks in which powdered malted milk or other similar substance is used in the drink. Drinks containing a portion of milk, ice cream and powdered malted milk are now quite popular. It has been the common practice to have the malted milk in a jar and to take out one or two spoonfuls of the same to place in the receptacle in which the drink is mixed.

It is an object of this invention to provide a machine for mixing the drink having thereon means for holding a malted milk container together with a measuring device for selecting and discharging a certain quantity of the malted milk into a receptacle.

It is a further object of the invention to provide a drink mixing device comprising a standard having an upper portion to which a motor is secured, said motor having an armature shaft projecting downwardly with a mixer thereon, said standard having an intermediate portion adapted to accommodate a receptacle in which the drink is mixed and having means for supporting the same with the mixer therein, additional means preferably being provided adapted to be engaged by the receptacle for starting the motor.

It is still another object of the invention to provide a drink mixing device comprising a standard with a motor secured to the upper portion thereof, said motor having a catch secured thereto adapted to hold a receptacle between the same and the standard, said motor having an armature shaft with a mixer secured thereto which preferably extends downwardly and toward the standard.

It is a further object of the invention to provide a drink mixing device comprising a standard having a base portion, an upper portion with means for receiving and holding a container, a measuring and discharge device below said container adapted to be operated by a handle at the side of said standard, the standard having a switch in the base portion and having an intermediate portion adjacent which a receptacle is disposed said standard having supporting means for said receptacle together with a member in said standard connected to said switch and having means adapted to be engaged by the receptacle and placed on said supporting means to close said switch and start a motor secured to the upper portion of the standard operating a mixing device in said receptacle.

It is still a further object of the invention to provide a drink mixing device comprising a standard having means for holding a container adapted to contain the material used in the drink, together with a measuring device for said material and operating means for said measuring device and a counter for registering the number of times said measuring device is operated.

These and other objects and advantages of the invention will be fully set forth in the following description made in connection with the accompanying drawings, in which like reference characters refer to similar parts throughout the several views, and in which:—

Fig. 1 is a view in side elevation of the device, certain parts being broken away and others shown in vertical section;

Fig 2 is a view in front elevation of the device;

Fig. 3 is a bottom plan view of the device;

Fig. 4 is a horizontal section taken on line 4—4 of Fig. 2 as indicated by the arrows;

Fig. 5 is a rear view of the upper portion of the device, certain parts being broken away and others shown in vertical section;

Fig. 6 is a vertical section taken on line 6—6 of Fig. 5 as indicated by the arrows, and Fig. 7 is a vertical section taken on line 7—7 of Fig. 5 as indicated by the arrows.

Referring to the drawings, a device is shown comprising a standard 10 having a base portion 10a which may be provided with feet 11 secured thereto in any suitable manner, which preferably are of some resilient material, such as rubber. Said standard has an intermediate portion 10b and an upper portion 10c. The upper portion 10c has fitted into its top a member 12 shown detached in Fig. 6 which member at its top has a cylindrical flange and while this may be variously constructed, in the embodiment of the invention illustrated it is illustrated as provided with interior threads 12a adapted to have screwed thereinto the threaded top of a container 13 shown as having a cover 13a thereon. A chamber 10e is formed in the member 12 immediately below the container 13 and a measuring member 14 is journaled in a transverse bore formed in this chamber. Said member 14 comprises a central portion formed as a cylindrical chamber with an open portion 14a at one side, the same being shown at the top in Fig. 6, said chamber having end walls 14b and 14c. Member 14 has a trunnion 14d at one end journaled in a boss formed on a plate member 16, said trunnion having a portion of angular shape at its end on which is fitted the hub of a crank member 15 disposed at the side of portion 10c. Crank 15 has a handle portion 15a and is held in place by a washer 17 abutting its outer end and the end of trunnion 14d, said washer being held in place by a screw 17a threaded into the end of trunnion 14d. Plate 16 fits in a vertically extending slot in the side of portion 10c and is held in place by the sides of said slot and crank 15. Projecting from end wall 14b member 14 has arms 14e and 14f forming stop members and adapted to engage upon rotation of member 14 with a stop lug 14a formed on a plug 18 inserted into a bore in portion 10c and held therein by a screw 19 threaded into its end. Arm 14e is shown as having secured in its edge a plate 20 of some soft or yielding material, such as rubber. Member 14 has at the end of wall 14c a torsion spring 21 secured thereto, the other end of said spring being secured in the end of the bore in which member 14 is disposed or in the wall of portion 10c of the standard. Member 14 has another trunnion 14h journaled in portion 10c to the end of which is secured by spaced screws 22 a plate or disk 23. Disk 23 has a stud 24 secured therein over which is placed the eyeletted end of a link 24, the same being held on said stud by a nut 26 screwed onto the stud. Link 25 is bent to extend to the rear of member 12 and is connected at its other end to a crank arm 27, said link having an eyelet at its end passing through an opening on said crank as shown in Fig. 6. Crank 27 as shown in Fig. 5 is of Z shape having a split hub which is clamped by a screw 28 onto the operating shaft 29 of a counter device 30, said counter device having a side opening therein through which the figures 30a may be seen indicating the number of movements of said counter. The counter device 30 is secured to the rear of member 12 by screws 31 and its outer side is disposed in an opening 10g in portion 10c.

Counter device 30 can be turned back to its zero starting point by inserting a key into a key slot 30b which slot is accessible through an opening 10i in the portion 10c. There is a discharge spout 12d below the measuring device 14.

The portion 10c of the standard has plate-like extensions 10e extending forward therefrom which are disposed in recesses formed at the sides of a motor casing 32, said motor being secured by the screws 33 and said motor casing being of semi-cylindrical form. The motor in casing 32 has a downwardly extending armature shaft 34 to which is secured a member 35 carrying at its lower end a mixing member 36. Member 35 is shown as being secured to the shaft 34 by a set screw 37. It will be noted that shaft 34 and member 35 project downwardly and are inclined inwardly so as to extend toward the standard 10. The intermediate portion of standard 10 has its front wall provided with a concave surface as shown in Fig. 4. Adjacent the lower end, said portion 10b has projecting lugs 10f to the front surface of which is secured a plate 38 having a toothed or notched upper surface.

The base portion 10a has secured therein a switch member 39 having a downwardly projecting stem or member 40 by which it is closed, said switch being constructed and arranged to open when pressure is removed from member 40. A conductor 41 extends from switch 39 and has branches secured to one terminal of the plugs 42 respectively, which plugs are secured at the sides of base member 10a. One plug has projecting terminals or electrodes 43 over which a connecting socket may be placed to supply current to said plug and the other plug has a pair of sockets for receiving such electrodes. Conductors 44 extend from the other terminal of the plugs 42 respectively and are connected to a conductor 45 which extends to the motor in casing 32. Another conductor 46 extends from switch 39 to the motor in casing 32. A bar 47 extends vertically in standard 10 and has a horizontal portion at its lower end disposed under the member 40. Bar 47 is reciprocable in standard 10, the upper arm moving in the slot in portion 10c. Bar 47 has a member or bracket 48 secured adjacent its upper end, the same being shown as having three sides at right angles, of substantially U shape. Bracket 48 projects forwardly through an opening in the front of the standard and has one side projecting downwardly. Motor casing 32 has clips 49 secured thereto having downwardly extending portions with inwardly and outwardly bent terminals forming catches. One clip 49 is shown at the front of casing 32 and one is shown at each side thereof.

In operation the malted milk or similar substance may be placed in the container 13. When a drink is to be mixed, receptacle 50 indicated in dotted lines in Fig. 1 is used, which is usually frusto-conical in shape and has an open upper end. The liquid, ice cream, flavoring and other materials to be used in the drink are placed in the said receptacle, the receptacle is then positioned in the front of standard 10 at the intermediate portion 10b thereof, the edge of said receptacle being placed under bracket 48. The receptacle is raised by hand thus lifting bracket 48 and bar 47 and when at the proper height the lower portion of the receptacle is pushed inwardly and the bottom disposed on the member 38. The operator will now depress the crank 15 and a certain amount of the malted milk which has passed down into the chamber of member 12 and into the opening in member 14 will be measured out as said member 14 rotates. As the member 14 is rotated the opening 14a therein will be disposed downwardly in line with the discharge chute 12d. The material in member 14 will then be discharged downwardly and will pass into the receptacle 50. After the receptacle was placed in position and bar 47 raised the lower end of the bar pressed on member 40 closing switch 39 and started the motor in casing 32. The motor now operates and drives the mixer 35 and the materials in receptacle 50 will be properly stirred and mixed. When the operator lets go of crank 15, spring 21 returns it to normal position with plate 20 engaging lug 18a. When member 14 was turned disk 23 was also turned and crank 27 turned through the link 25 thus operating counter device 30 and registering one movement on the counter. After sufficient time has elapsed for the drink to be properly mixed the operator will remove receptacle 50 and bar 47 will then drop releasing member 40 and open switch 39 to stop the motor. If it is desired to hold the receptacle on the device without operating the motor the same will be pushed upwardly between the front upper surface of the portion 10b of the standard and between clips 49 and said receptacle will thus be held in said position as indicated in Fig. 1.

From the above description it is seen that applicant has provided a very simple and efficient drink mixing device. With the measuring device or dispensing mechanism a fixed amount of malted milk is dispensed with every drink. The malted milk is effectively handled and there is no chance of spilling the same as often happens when it is handled with a spoon. By having a fixed amount dispensed uniformity in the drinks is obtained and a saving often effected in the material. The semi-cylindrical motor casing is adapted for easy and convenient attachment to the device and at the same time creates a pleasing appearance and results in a substantially smooth surface at the sides of the device. All parts of the device are quite accessible and member 14 can easily be removed for cleaning if desired. Since one of the plugs 42 is a male plug and the other a female plug, several of the machines can be set side by side and connected by having the electrodes 43 enter the sockets on the adjacent plug 42. Only one cord or set of conductors will then have to be used to supply current to the battery of machines. This cord can be attached to one end machine. The counter device affords a check on the employees and this can only be turned back by a special key which will be in the hands of the proprietor.

The device has been amply demonstrated in actual practice and found to be very successful and efficient.

It will, of course, be understood that various changes may be made in the form, details, proportions and arrangement of the parts, without departing from the scope of applicant's invention, which generally stated, consists in a device capable of carrying out the objects above set forth, in the novel parts and combinations of parts disclosed and defined in the appended claims.

What is claimed is:—

1. A drink making apparatus having in combination, a frame comprising a standard, a motor mounted on the upper end of said standard, said motor having a shaft projecting downwardly adjacent said frame carrying a mixing device, a catch depending from said motor, said frame having a surface opposite said catch and spaced therefrom so that the receptacle may be placed against said surface and held in place by said catch with said mixer disposed therein when the motor is not running.

2. A drink mixing apparatus having in combination, a standard having a base portion, an intermediate portion and an upper portion, said upper portion having a forwardly projecting part, a motor secured to said part having a downwardly extending armature shaft, a mixing device secured to said shaft, a switch in said base portion for controlling the motor circuit, a member extending upwardly in said intermediate portion adapted to be raised to close said switch, means projecting forwardly at the upper portion of said intermediate portion adapted to be engaged by an open-top receptacle to be raised thereby and means at the forward part of said intermediate portion for supporting the bottom of said receptacle after said member has been raised and said switch closed.

3. The structure set forth in claim 2, the forward surface of said intermediate portion being concave and said last mentioned means comprising a member extending between the sides of said concave surface.

4. A drink mixing apparatus comprising a standard, a motor secured to the top portion of said standard at the forward side thereof, said motor having a shaft extending downwardly at an incline to the vertical toward the lower portion of the standard, a stirrer secured to said shaft and axially aligned therewith, the front of said standard being constructed and arranged to have the side of a frusto conical open-topped receptacle disposed adjacent thereto with said stirrer projecting into the receptacle and means for holding the receptacle in such position with the stirrer extending substantially parallel with the outer side of the receptacle.

5. A drink mixing apparatus comprising a standard, a motor secured to the front side of the upper end of said standard, a stirrer projecting downwardly below said motor and operated therefrom, said standard being of concave shape at its front side below said motor to receive an open-topped receptacle having a convexly curved side and a toothed bar extending across the front of said standard below said motor for supporting the bottom of the receptacle without permitting the same to slip.

6. A drink mixing apparatus having in combination, a frame, a dispensing device secured to said frame having a discharge means at its bottom, a motor rigidly secured to said frame, a stirrer secured to and depending from said motor and driven thereby, means for supporting a receptacle in one position with its top below said discharge means and said stirrer therein with said motor not running, means for supporting said receptacle in another position with its top below said discharge means and with said stirrer therein and means actuated by said receptacle for starting said motor when placed in said latter position.

7. A drink mixing apparatus having in combination, a frame having a base with a side constructed and arranged to be disposed closely adjacent the base of a similar machine, a motor carried on said frame, a mixing member driven by said motor, a plug rigidly secured in said base, contacts projecting from said plug and from a side surface of said base, a socket rigidly secured in said base having spaced apertures exposed at another side of said base with contacts therein containing contact members permanently connected to said motor, said last mentioned contacts being connected respectively to said first mentioned contacts so that a plurality of said devices may be placed side by side and the first mentioned contacts of one may be disposed in the apertures in the socket of an adjacent one and said members thus electrically connected so that only the socket of one need be connected to a source of current.

8. A drink mixing apparatus having in combination, a base, a standard upstanding therefrom, a dispensing device having a discharge means adjacent the top of said standard, means on the front of said standard for supporting a receptacle with an open end under said discharge means, a motor rigidly secured to the front of said standard adjacent the top thereof and adjacent said discharge means, said motor having a driving shaft directed downwardly and a mixing member secured to said shaft and extending in the same axial direction as said shaft, whereby said stirrer can be disposed in said receptacle and pass into the the open top thereof while said top is disposed under said container, and a manually operated means at one side of said standard and at one side of said dispensing device for operating said dispensing device whereby said device can be used to mix a drink with or without material from said dispensing device.

In testimony whereof I affix my signature.

THEODORE M. COSTAKOS.